(12) United States Patent
Takada

(10) Patent No.: US 6,173,058 B1
(45) Date of Patent: Jan. 9, 2001

(54) SOUND PROCESSING UNIT

(75) Inventor: Masashi Takada, Tokyo (JP)

(73) Assignee: Oki Electric Industry Co., Ltd., Tokyo (JP)

( * ) Notice: Under 35 U.S.C. 154(b), the term of this patent shall be extended for 0 days.

(21) Appl. No.: 09/210,957

(22) Filed: Dec. 15, 1998

(30) Foreign Application Priority Data

Feb. 18, 1998 (JP) ................................. 10-036209
Jul. 2, 1998 (JP) ................................. 10-187536

(51) Int. Cl.$^7$ ................................. H04B 3/20
(52) U.S. Cl. ................. 381/66; 381/151; 381/57; 379/406; 379/410
(58) Field of Search ................. 381/57, 56, 58, 381/59, 66, 326, 317, 318, 320, 71.6, 93, 94.1, 95, 151, FOR 130; 379/406, 410, 411; 708/322

(56) References Cited

U.S. PATENT DOCUMENTS

| | | | |
|---|---|---|---|
| 4,225,754 | * | 9/1980 | Bernard et al. ................. 381/66 |
| 4,636,586 | * | 1/1987 | Schiff ................. 381/66 |
| 5,247,512 | * | 9/1993 | Sugaya et al. ................. 379/406 |
| 5,386,465 | * | 1/1995 | Addeo et al. ................. 381/83 |
| 5,390,250 | * | 2/1995 | Janse et al. ................. 379/410 |
| 5,463,618 | * | 10/1995 | Furukawa et al. ................. 379/410 |
| 5,475,759 | * | 12/1995 | Engebretson ................. 381/320 |
| 5,636,323 | * | 6/1997 | Umemoto et al. ................. 381/66 |
| 5,661,814 | * | 8/1997 | Kalin et al. ................. 381/93 |
| 5,675,644 | * | 10/1997 | Sih ................. 379/406 |
| 5,757,934 | * | 5/1998 | Yokoi ................. 381/151 |
| 5,774,562 | * | 6/1998 | Furuya et al. ................. 381/66 |
| 5,796,819 | * | 8/1998 | Romesburg ................. 379/406 |
| 5,805,696 | * | 9/1998 | Im et al. ................. 379/410 |
| 5,818,945 | * | 10/1998 | Makino et al. ................. 381/66 |
| 5,859,914 | * | 1/1999 | Ono et al. ................. 381/66 |
| 5,894,513 | * | 4/1999 | Nasu ................. 379/406 |
| 5,993,506 | * | 8/1999 | Aoki et al. ................. 381/151 |
| 6,035,034 | * | 3/2000 | Trump ................. 379/410 |

FOREIGN PATENT DOCUMENTS

| | | | | |
|---|---|---|---|---|
| 0643878 | * | 9/1992 | (AU) | ................. 379/406 |
| 2240452 | * | 7/1991 | (GB) | ................. 381/66 |
| 1-12727 | * | 1/1989 | (JP) | ................. 381/66 |
| 8-340590 | | 12/1996 | (JP) | . |
| WO 90/05436 | * | 5/1990 | (WO) | ................. 381/FOR 127 |
| WO 94/09604 | * | 4/1994 | (WO) | ................. 381/FOR 127 |

* cited by examiner

Primary Examiner—Forester W. Isen
Assistant Examiner—Xu Mei
(74) Attorney, Agent, or Firm—Rabin & Champagne, P.C.

(57) ABSTRACT

A sound processing unit contains a speaker disposed at a position on a body of the sound processing unit, which outputs an input sound signal; a microphone disposed at another position on the body of the unit; a vibration pick-up disposed at a position near the speaker on the body of the unit such that the ear of the user touches the pik-up during conversation, which detects a bone conduction sound and which outputs it as a bone conduction sound signal; and a double talk detector that compares a level of the input sound signal with a level of the transmitting signal, and outputs a state signal to indicate a receiving state when the level of the input sound signal is judged to be more than a first specific value and the level of the transmitting signal is judged to be less than a second specific value. A first adaptive filter updates a first filter coefficient when the state signal indicates the receiving state, and generates to output an estimated-echo signal in accordance with the first filter coefficient on the basis on the input sound signal and an estimated bone conduction sound signal. A first adder subtracts the estimated-echo signal from the bone conduction sound signal and outputs the estimated bone conduction sound signal. A second adder adds the transmitting signal and the estimateed bone conduction sound signal and outputs an emphasized sound signal. An amplifier regulates a level of the emphasized sound signal to have the same level as the level of the transmitting signal.

16 Claims, 3 Drawing Sheets

SOUND PROCESSING UNIT

BACKGROUND OF THE INVENTION

1. Field of the Invention

The present invention relates to a sound processing unit in the transmitter/receiver set of a telephone, wireless equipment, and the like.

2. Description of the Related Art

Earphones and high-directionality microphones are used in conversations between a pilot and a pathfinder in an airport, and in conversations by telephones and wireless equipment in an environment with a high level of noises as a construction field.

However, when the noises are enormous, not only the voices of a persons to be transmitted, but the surrounding noises come in through the earphone and the microphone, so that the partner of the call finds it very difficult to catch the voice of the person transmitting.

In order to solve such a problem, earphone-mic equipment has been proposed, which has a function to detect the voices regardless of the surrounding noises, utilizing vibrations of the internal wall of the external auditory meatus generated when a person speaks, namely, bone conduction sound signals. This earphone-mic houses a vibration pick-up that detects the bone conduction sound signals, and a speaker in the ear piece. This earphone-mic is to be worn on the ear of a user, and is connected through signal lines to a transceiver or a portable telephone.

However, the vibration pick-up of this earphone-mic detects not only the bone conduction sound signals, but also the vibrations generated when the speaker emits sounds. In consequence, the vibrations are transmitted to the other party to the call as an echo, which reduces the quality of conversation.

However, the invention disclosed in the Japanese Patent:Laid-Open publication No. H8-340590 proposes an earphone-mic that suppresses such an echo and improves the quality of conversation. Concretely, this earphone-mic contains, in addition to a speaker and a vibration pick-up, a microphone to detect sounds that the speaker emits; and suppresses the echo in such a manner that a signal detected by the microphone is subtracted from a signal detected by the vibration pick-up.

Here, the level of a signal detected by the microphone is regulated to have the same level as a signal component detected by the vibration pick-up by a frequency equalizer circuit in each frequency band, and then, the signal detected by the microphone is inputted to a subtraction circuit.

However, the voice of the person transmitting is not only detected by the vibration pick-up, but also can be detected in part by the microphone for detecting the output sounds from the speaker. The subtraction of the signal detected by the microphone from the signal detected by the vibration pick-up involves an attenuation of a signal level corresponding to the voices of the person to transmit. This attenuation further increases by the regulation performed by the frequency equalizer circuit.

Further, the conventional earphone-mic that utilizes bone conduction sound signals has to be worn on the user's ear; and there are problems in wearing it and inconvenience in responding during reception.

SUMMARY OF THE INVENTION

The present invention has been made in view of the foregoing problems, and an object of the present invention is to provide a sound processing unit capable of removing the influence of noise in environments having an enormous noises.

In order to accomplish the foregoing object, the sound processing unit according to the invention is comprised of: a sound outputting means such as a (speaker) that outputs to the outside an input sound signal from a partner of a call as a voice of the partner of the call, a vibration detection means (such as a vibration pick-up) for detecting a bone conduction signal of a voice of a person to transmit, a first adaptive filter that estimates an echo component detected by the vibration detection means from an output of the sound outputting means on the basis of the input sound signal, and outputs a estimated-echo signal, a first adding means (first adder) that subtracts the estimated-echo signal from an output of the vibration detection means and outputs an estimated bone conduction sound signal, and a judgment means (such as a double talk detector) that judges if the input sound signal is silent or not and if the voice of the person to transmit is silent or not.

DESCRIPTION OF THE PREFERRED EMBODIMENTS

Preferred embodiments of the invention will be described in detail with reference to the accompanying drawings.

Figure 1:
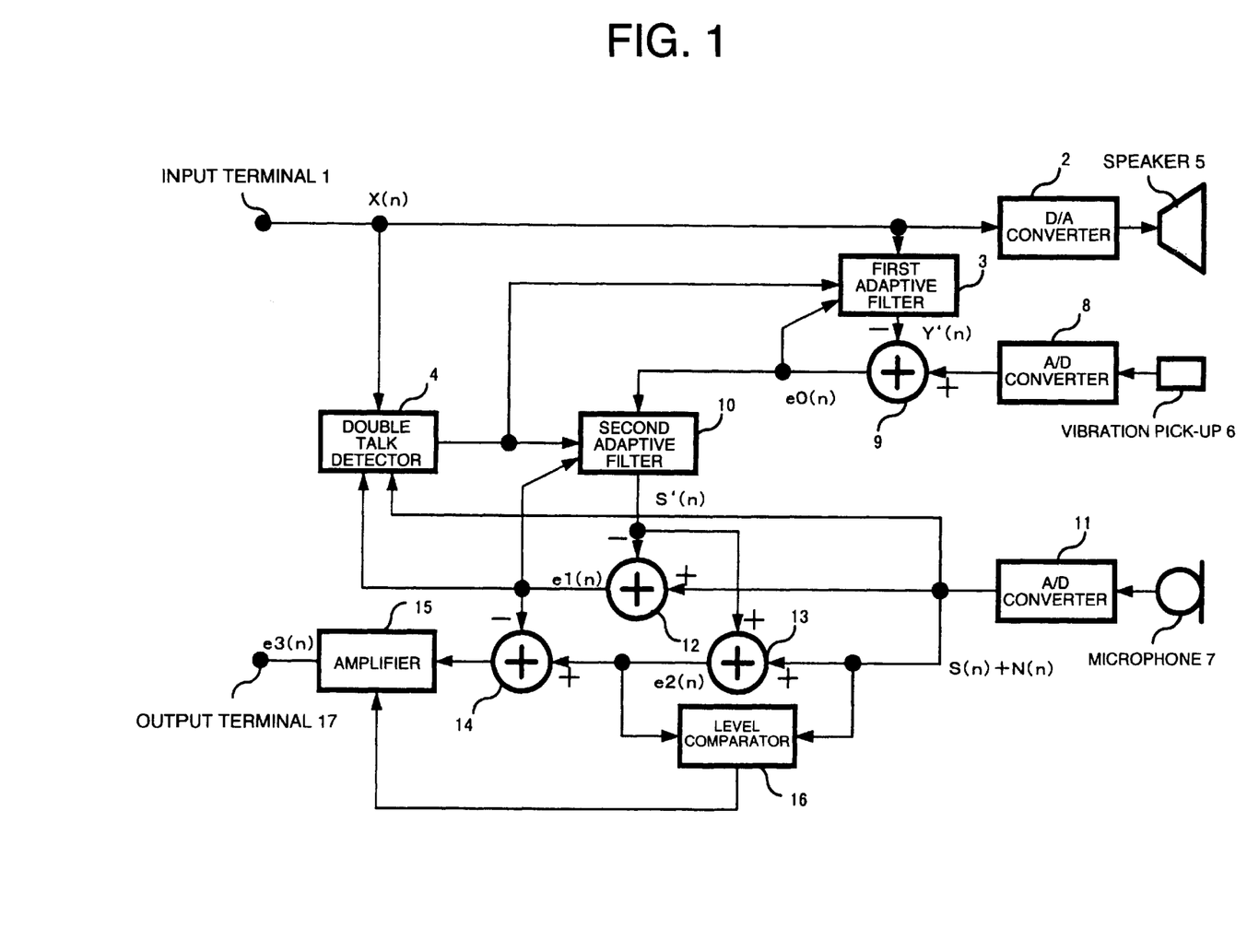
FIG. 1 is a block diagram of the first embodiment of a transmitter/ receiver set according to the present invention.

FIG. 1 is a block diagram of the first embodiment of a transmitter/receiver set according to the invention.

The transmitter receiver set of the first embodiment is comprised of an input terminal 1, D/A converter 2, first adaptive filter 3, double talk detector 4 to output a signal to determine the state of conversation (hereinafter also "conversation state") between a person to transmit a voice signal from the set during a call and a partner of the call, speaker 5 to be held near the ear of the person to transmit, vibration pick-up 6, microphone 7, A/D converters 8, 11, first adder 9, second adaptive filter 10, second adder 12, third adder 13, fourth adder 14, amplifier 15, level comparator 16, and output terminal 17.

Hereafter, the operation of the transmitter/receiver set of the first embodiment according to the invention will be described.

An input sound signal $X(n)$ from a partner of the call is inputted through the input terminal 1 to the D/A converter 2, the first adaptive filter 3, and the double talk detector 4. Here, n indicates time.

The input sound signal $X(n)$ inputted to the D/A converter 2 is converted into an analog sound signal, which is outputted from the speaker 5. A part of the analog sound signal outputted from the speaker 5 is emitted into the space near the ear, and is inputted to the vibration pick-up 6 as an echo Y.

On the other hand, a voice signal S from the person to transmit is inputted through the microphone 7, and at the same time inputted also to the vibration pick-up 6 as a bone conduction sound S1. That is, $$S \cong S1 \quad (1)$$

The bone conduction sound S1 as well as the echo Y inputted to the vibration pick-up 6 is converted by the A/D converter 8, and the converted digital signal is outputted as a signal S1(n)+Y(n) that combines the bone conduction sound signal S1(n) and the echo signal Y(n). The signal S1(n)+Y(n) is inputted to the first adder 9.

On the other hand, the first adaptive filter 3 with the input sound signal X(n) inputted estimates the echo signal Y(n) on the basis of the input sound signal X(n), and outputs the estimated result as a estimated-echo signal Y2(n). That is, $$Y(n) \cong Y2(n) \quad (2)$$

The concrete operation of estimation in the first adaptive filter 3 will be described later. The estimated-echo signal Y2(n) is also inputted to the first adder 9.

The first adder 9 subtracts the estimated-echo signal Y2(n) output from the first adaptive filter 3 from the signal S1(n)+Y(n), and outputs an estimated bone conduction sound signal e0(n). That is, the estimated bone conduction sound signal e0(n) satisfies the following relation from the equation (1) and the equation (2):

$$e0(n)=S1(n)+Y(n)-Y2(n) \cong S(n)+Y(n)-Y(n)=S(n) \quad (3)$$

The estimated bone conduction sound signal e0(n) is inputted to the first adaptive filter 3, and is used to generate the estimated-echo signal Y2(n).

Further, the estimated bone conduction sound signal e0(n) is inputted to the second adaptive filter 10. The second adaptive filter 10 outputs an estimated sound signal S2(n) on the basis of the estimated bone conduction sound signal e0(n). That is, $$S2(n) \cong S(n) \quad (4)$$

The concrete operation of estimation in the second adaptive filter 10 will be described later.

The voice S from the person to transmit is inputted through the microphone 7, which is already mentioned; however, a background noise N is inputted also through the microphone 7 in addition to the voice S. The voice S+the background noise N is converted by the A/D converter 11 into a digital sound signal S(n)+a digital background noise N(n). The transmitting signal S(n)+N(n) is inputted to the double talk detector 4, the second adder 12, and the third adder 13.

The second adder 12 subtracts the estimated sound signal S2(n) output from the second adaptive filter 10, from the transmitting signal S(n)+N(n), and outputs a residual signal e1(n). The residual signal e1(n) satisfies the following equation from the equation (4):

$$e1(n)=S(n)+N(n)-S2(n) \cong N(n) \quad (5)$$

The residual signal e1(n) is inputted to the second adaptive filter 10, the double talk detector 4, and the fourth adder 14.

The third adder 13 adds the transmitting signal S(n)+N(n) and the estimated sound signal S2(n) output from the second adaptive filter 10, and outputs an emphasized sound signal e2(n). The emphasized sound signal e2(n) satisfies the following equation from the equation (4):

$$e2(n)=S(n)+N(n)+S2(n) \cong 2S(n)+N(n) \quad (6)$$

This equation (6) confirms that the sound signal component S(n) of the emphasized sound signal e2(n) is about doubled in relation to the noise component N(n).

Incidentally, as to the transmitting signal S(n)+N(n) and the signal S2(n) which are inputted to the second adder 12 and the third adder 13, there is a case that the generation of the signal S2(n) is delayed in time against the transmitting signal S(n)+N(n). In such a case, it is preferable that a delay element is inserted between the A/D converter 11 and the second and third adders 12, 13 so as to synchronize the signal S2(n) with the transmitting signal S(n)+N(n).

Further, in the processes as performed by second adder 12 and the third adder 13, the estimated bone conduction sound signal e0(n) may be used in place of the estimated sound signal S2(n). However, it takes a certain time, until the estimated-echo signal Y2(n) generated by the first adaptive filter, sufficiently approaches the echo signal Y(n). While the estimated-echo signal approaches sufficiently to the echo signal, the estimated bone conduction sound signal e0(n) contains the difference between the echo signal Y(n) and the estimated-echo signal Y2(n). The estimated sound signal S2(n) is a signal estimated by the second adaptive filter 10 on the basis of the estimated bone conduction sound signal e0(n). Owing to the filter processing performed by the second adaptive filter 10 the influence of the difference between the echo signal Y(n) and the estimated-echo signal Y2(n) contained in the estimated sound signal S2(n), is reduced.

The fourth adder 14 subtracts the residual signal e1(n) from the emphasized sound signal e2(n), and outputs a noise elimination signal e4(n). The noise elimination signal e4(n) satisfies the following equation from the equations (5), (6):

$$e4(n)=e2(n)-e1(n) \cong 2S(n)+N(n)-N(n) \cong 2S(n) \quad (7)$$

That is, the noise elimination signal e4(n) is a sound signal in which the noise component has been removed.

Here, the noise elimination signal e4(n) has a higher level than the original output level of the sound signal S(n); and therefore, it is inputted to the amplifier 15, where the level is regulated as follows.

The transmitting signal S(n)+N(n) outputted from the A/D converter 11, and the emphasized sound signal e2(n) output from the third adder 13, are inputted to the level comparator 16. The level comparator 16 outputs to the amplifier 15 the calculation result C given by the following equation.

$$C=E\{e2(n)/\{S(n)+N(n)\}\} \quad (8)$$

(E{·} represents the mean value)

The amplifier 15 multiplies the level of the noise elimination signal e4(n) by 1/C, and outputs the amplified signal as an output sound signal e3(n). Thereby, the level of the sound signal S(n) becomes almost equal to the level of the output sound signal e3(n) e3(n).

In the processing of the amplifier 15, instead of the noise elimination signal e4(n) may be used the emphasized sound signal e2(n), the noise component N(n) to which has a low level that is low in relation to the level of its sound signal component S(n).

This output sound signal e3(n) is outputted through the output terminal 17 to the partner of the call.

The operation of the double talk detector 4 will now be described.

As the double talk detector 4 can be employed a general double talk detector, which is conventionally used for the determination of conversation state in telephone communications. This general double talk detector compares levels of the input sound signal, the transmitting signal, and a level difference between the input sound signal and the transmitting signal. On the basis of the comparison result, the detector outputs the transmitting state, transmitting/receiving state, receiving state, and silent state.

The double talk detector 4 described here takes into account the level of noise in addition to the level of the input sound signal and the level of the signal being transmitted (transmitting signal). The double talk detector 4 receives, as mentioned above, the input sound signal X(n), the transmitting signal S(n)+N(n), and the residual signal e1(n). The double talk detector 4 determines the conversation by comparing the levels of the input sound signal X(n), the transmitting signal S(n)+N(n), and the residual signal e1(n), with predetermined threshold levels.

For example, a threshold β1=−40 dB, a threshold β2=−40 dB, a threshold β3=5 dB, and a threshold β4 dB, are assumed to be determined beforehand.

If all of the following equations are met, the conversation state is determined to be a single talk state (talk by the partner of the call) in which only the voice of the partner of the call is received and the voice of the person to transmit is hardly transmitted:

$$X(n) > \beta1 \tag{9}$$

$$S(n)+N(n) > \beta2 \tag{10}$$

$$X(n) > e1(n) \text{ or } |X(n)/(S(n)+N(n))| > \beta3 \tag{11}$$

If all of the following equations are met, the conversation state is determined to be a double talk state in which the voice of the partner of the call is received and the voice of the person to transmit is transmitted:

$$X(n) > \beta1 \tag{12}$$

$$S(n)+N(n) > \beta2 \tag{13}$$

$$|X(n)/(S(n)+N(n))| \leq \beta3 \tag{14}$$

If all of the following equations are met, the conversation state is determined to be an echo path release state in which there is some trouble in the microphone 7 or on the periphery of the microphone 7, and outside sounds are not inputted through the microphone 7:

$$X(n) > \beta1 \tag{15}$$

$$S(n)+N(n) \leq \beta4 \tag{16}$$

If all of the following equations are met, the conversation state is determined to be a silent state in which the voices of the partner of the call is not received and the voice of the person to transmit is not transmitted:

$$X(n) \leq \beta1 \tag{17}$$

$$S(n)+N(n) \leq \beta2 \tag{18}$$

If all of the following equations are met, the conversation state is determined to be the single talk state (talk by the person to transmit) in which the voice of the partner of the call is not received and only the voice of the transmitting partner is transmitted:

$$X(n) \leq \beta1 \tag{19}$$

$$S(n)+N(n) > \beta2 \tag{20}$$

$$X(n)/(S(n)+N(n)) \leq \beta3 \tag{21}$$

The double talk detector 4 outputs a determination result to the first adaptive filter 3 and the second adaptive filter 10 as a determination signal indicative of the conversation state.

The method of estimating the estimated-echo signal Y2(n) in the first adaptive filter 3 will be described.

The first adaptive filter 3 receives the input sound signal X(n), the estimated bone conduction sound signal indicative e0(n), and the determination signal of the conversation state outputted from the double talk detector 4, and outputs the estimated-echo signal Y2(n). The first adaptive filter 3 stores tap coefficients of the number m as the filter coefficient The tap coefficients are updated, only when the bone conduction sound signal S1(n) is nearly equal to zero and the echo signal Y(n) is more than a specific level, in such a manner that the level of the estimated bone conduction sound signal e0(n), being the difference between the signal S1(n)+Y(n) and the estimated-echo signal Y(n), approximates zero.

Assuming that the present time is expressed by n and the j-th tap coefficient at that time is represented by Hj(n), the first adaptive filter 3 updates Hj(n+1) at time n+1 in accordance with the following equations (22) and (23). In order to better the echo estimation characteristic of the first adaptive filter 3, the equation for updating the tap coefficients is subdivided with regard to the cases of the single talk state (by the partner of the call) in which the level of the sound signal S(n) is almost equal to zero and the level of the input sound signal X(n) being the input signal to the first adaptive filter 3 is not zero, and the other states.

If the determination signal indicative of the conversation state indicates the single talk state (by the partner of the call), or the echo path release state, $$Hj(n+1) = Hj(n) + \alpha1 \cdot X(n) \cdot e0(n) \Big/ \sum_{j=1}^{m} X^2(n+1-j) \tag{22}$$

If the determination signal indicative of the conversation state indicates a state that is not the single talk state (by the partner of the call), nor the echo path release state, $$Hj(n+1)=Hj(n) \tag{23}$$

Here, β1 indicates the step gain, which determines the convergence speed of the first adaptive filter 3. β1 is determined within the range: 0≦β1≦1. As α1 becomes larger, the convergence speed of the first adaptive filter 3 becomes higher, and the echo estimation characteristic becomes worse in the steady state. As α1 becomes smaller, the convergence speed of the first adaptive filter 3 becomes lower, and the echo estimation characteristic becomes better in the steady state.

The first adaptive filter 3 produces the estimated-echo signal Y2(n) by using these tap coefficients Hj(n)(j=1,2, . . . m), according to the following equation:

$$Y2(n) = \sum_{j=1}^{m} Hj(n)X(n-j+1) \tag{24}$$

The first adaptive filter 3 outputs the estimated-echo signal Y2(n) obtained.

Next, the method of estimating the estimated sound signal S2(n) in the second adaptive filter 10 will be described.

The second adaptive filter 10 receives the estimated bone conduction sound signal indicative e0(n), the residual signal e1(n), and the determination signal of the conversation state outputted from the double talk detector 4, and outputs the estimated sound signal S2(n). The second adaptive filter 10 stores inside the tap coefficients of the number m2 as the filter coefficient.

The tap coefficients are updated, only when the echo signal Y(n) is nearly equal to zero and the sound signal S(n) is more than a specific level, in such a manner that the level of the residual signal e1(n), being the difference between the transmitting signal S(n)+N(n) and the estimated sound signal S2(n), approximates zero.

Assuming that the present time is expressed by n and the j-th tap coefficient at that time is represented by Hj(n), the second adaptive filter 10 updates Hj(n+1) at time n+1 in accordance with the following equations (25) and (26). In order to better the sound estimation characteristic of the second adaptive filter 10, the equation for updating the tap coefficients is subdivided as to the case of the single talk state (by the person to transmit) in which the level of the sound signal S(n) is more than a specific one and the level of the input sound signal X(n) being the cause of the echo signal Y(n), is almost equal to zero. Further, in the echo path release state, the level of the transmitting signal S(n)+N(n) becomes zero; and accordingly, the equation for updating the tap coefficients is subdivided as to this case.

However, it is not essential that the tap coefficients are updated in the echo path release state.

If the determination signal indicative of the conversation state indicates the single talk state (by the person to transmit), or the echo path release state, $$Hj(n+1) = Hj(n) + \alpha 2 \cdot e0(n) \cdot e1(n) \bigg/ \sum_{j=1}^{m2} e0^2(n+1-j) \quad (25)$$

If the determination signal indicative of the conversation state indicates a state other than the single talk state (by the person to transmit), or the echo path release state, $$Hj(n+1)=Hj(n) \quad (26)$$

Here, α2 indicates the step gain, which determines the convergence speed of the second adaptive filter 10. α2 is determined within the range: 0≦β2≦1. As α2 becomes larger, the convergence speed of the second adaptive filter 10 becomes higher, and the sound estimation characteristic becomes worse in the steady state. As α2 becomes smaller, the convergence speed of the second adaptive filter 10 becomes lower, and the sound estimation characteristic becomes better in the steady state.

The second adaptive filter 10 generates the estimated sound signal S2(n) by using these tap coefficients Hj(n) (j=1, 2, ... m2), according to the following equation:

$$S2(n) = \sum_{j=1}^{m2} Hj(n)\_e0(n-j+1) \quad (27)$$

The second adaptive filter 10 outputs the estimated sound signal S2(n) obtained.

Figure 2:
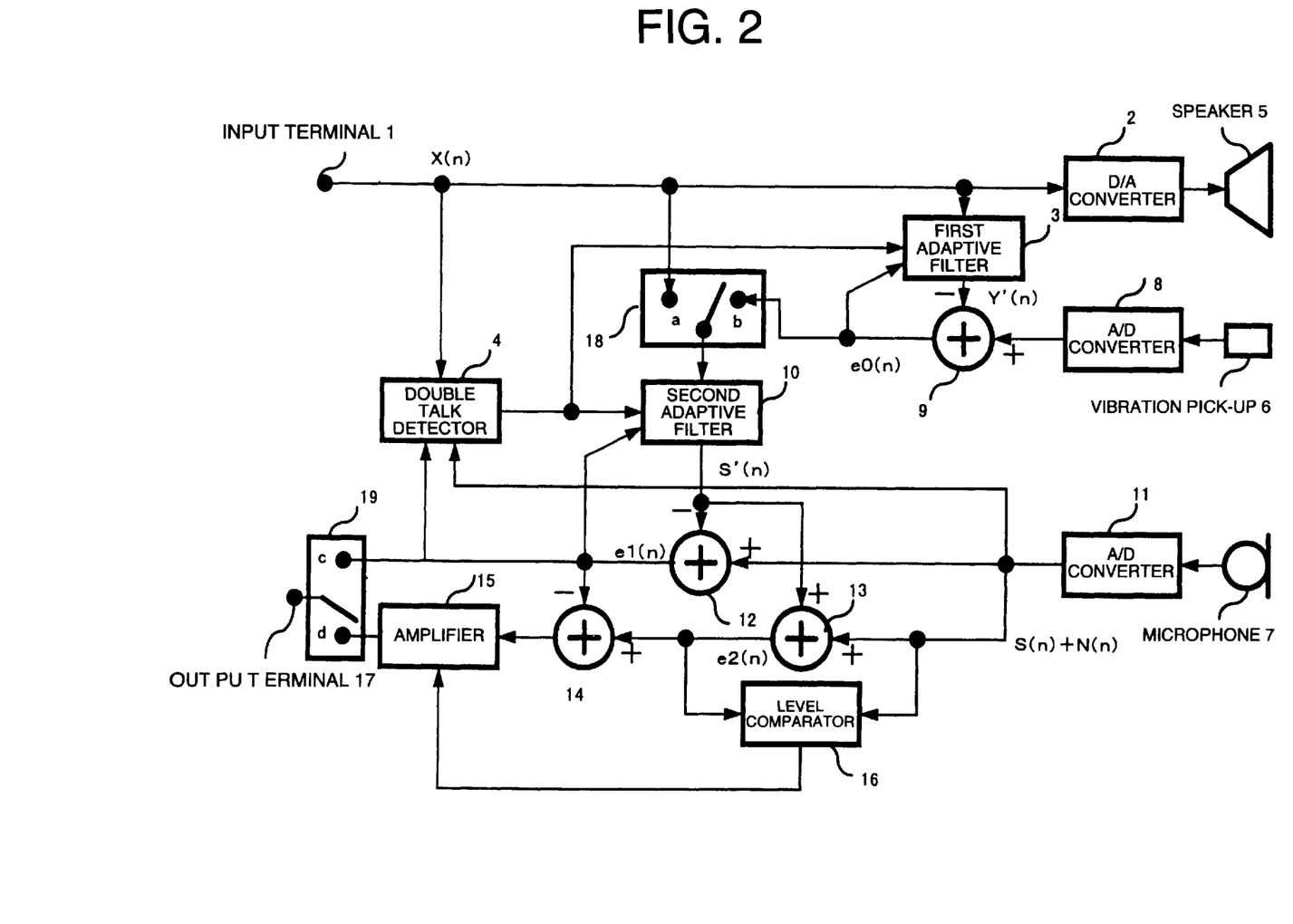
FIG. 2 is a block diagram of the second embodiment of a transmitter/ receiver set according to the present invention.

FIG. 2 is a block diagram of the second embodiment of a transmitter/receiver set according to the invention. In this drawing, the components used in the first embodiment are given the same reference symbols as those given in FIG. 1.

The transmitter/receiver set of the second embodiment is provided with a first switch 18 and a second switch 19 in addition to that of the first embodiment, whereby the use in the handsfree mode is made possible.

The first switch 18 is to switch the input to the second adaptive filter 10 to the input sound signal X(n) or the estimated bone conduction sound signal e0(n). Accordingly, the first switch 18 is connected such that the input sound signal X(n) is inputted to an input terminal a of the first switch 18, and the estimated bone conduction sound signal e0(n) is inputted to another input terminal b of the first switch 18; and the output terminal of the first switch 18 is connected to the second adaptive filter 10.

The second switch 19 is to switch the output signal from the output terminal 17 to the residual signal e1(n) or the output sound signal e (n). Accordingly, the second switch 19 is connected such that the residual signal e1(n) is inputted to an input terminal c of the second switch 19 and the output sound signal e (n) is inputted to another input terminal d of the second switch 19; and the output terminal of the second switch 19 is connected to the output terminal 17.

If the transmitter/receiver set is not in the handsfree mode, for example, when conversing by holding the set to the ear by hand, the first switch 18 is connected to the terminal b and the second switch 19 is connected to the terminal d.

If the set is in the handsfree mode, the first switch 18 is connected to the terminal a and the second switch 19 is connected to the terminal c.

The second adaptive filter 10 holds the tap coefficients Hj(n) (n=1, 2, ... m2).

The operation in case the set is not in the handsfree mode is completely the same as that in the first embodiment, and the description will be omitted, and the operation in the handsfree mode will be described.

When the first switch 18 is switched in the terminal a, and the second switch 19 is switched in the terminal c, the first adaptive filter 3, the first adder 9, the third adder 13, the amplifier 15, and the level comparator 16 halt their functions.

The input sound signal X(n) is inputted to the speaker 5, and is amplified by an amplifier (not illustrated) to a level sufficient for a handsfree conversation, by an amplifier and the amplified sound signal is outputted. The sound signal outputted from the speaker 5 propagates through the acoustic space, reflects on the walls, etc., and comes into the microphone 7 as the voice S of the person to transmit and the echo Y2 accompanied with the noise N. The voice S of the person to transmit+the noise N+the echo Y2 is converted into the transmitting signal S(n)+N(n)+Y2(n) by the A/D converter 11, which is inputted to the second adder 12.

Further, the input sound signal X(n) is inputted to the double talk detector 4 and the first switch 18. The input sound signal X(n) outputted from the first switch 18 is inputted to the second adaptive filter 10. The second adaptive filter 10 outputs the estimated-echo signal Y3(n) to the second adder 12 on the basis of the input sound signal X(n). That is, $$Y3(n) \approx Y2(n) \quad (28)$$

The second adder 12 subtracts the estimated-echo signal Y3(n) from the transmitting signal S(n)+N(n)+Y2(n), and outputs the residual signal e1(n), so that e1(n)=S(n)+N(n)+Y2(n)−Y3(n)≈S(n)+N(n)+Y2(n)−Y2(n)=S(n)+ N(n) (29)

The residual signal e1(n) is inputted to the second adaptive filter 10 and the double talk detector 4. And, the residual signal e1(n) is outputted through the output terminal 17 as the output sound signal.

The operation of the second adaptive filter 10 at this moment will be described.

The second adaptive filter 10 receives the input sound signal X(n), the residual signal e1(n), and the determination signal indicative of the conversation state outputted from the double talk detector 4, and outputs the estimated-echo signal Y3(n).

The second adaptive filter 10 updates the tap coefficients Hj(n) in accordance with the following equations (30) and (31). These tap coefficient are updated such that the residual signal e1(n) being the difference between the transmitting signal S(n)+N(n)+Y2(n) and the estimated-echo signal Y3(n) approximates zero. When the tap coefficient is updated in the case that the level of the echo signal Y(n) is more than a specific one, and the sound signal is nearly equal to zero, the sound estimation characteristic of the second adaptive filter 10 is improved. Therefore, the equation for updating the tap coefficients is subdivided as to the single talk state (by the partner of the call), as shown in the equations (30) and (31).

If the determination signal of the conversation state indicates the single talk state (by the partner of the call), $$Hj(n+1) = Hj(n) + \alpha 3 \cdot X(n) \cdot e1(n) \bigg/ \sum_{j=1}^{m2} X^2(n+1-j) \quad (30)$$

If the determination signal indicative of the conversation state indicates a state other than the single talk state (by the partner of the call), $$Hj(n+1) = Hj(n) \quad (31)$$

Here, α3 indicates the step gain in the handsfree mode, which determines the convergence speed of the second adaptive filter 10. α3 is determined within the range: 0≦α3≦1. As α3 becomes larger, the convergence speed of the second adaptive filter 10 becomes higher, and the estimation characteristic of the estimated-echo signal Y2(n) becomes worse in the steady state. As α3 becomes smaller, the convergence speed of the second adaptive filter 10 becomes lower, and the estimation characteristic of the estimated-echo signal Y2(n) becomes better in the steady state.

The second adaptive filter 10 generates the estimated-echo signal Y3(n) by using this tap coefficients Hj(n) (j=1, 2, . . . m2), according to the following equation:

$$Y3(n) = \sum_{j=1}^{m2} Hj(n) \cdot e1(n-j+1) \quad (32)$$

The second adaptive filter 10 outputs the estimated-echo signal Y3(n) obtained.

Figure 3:
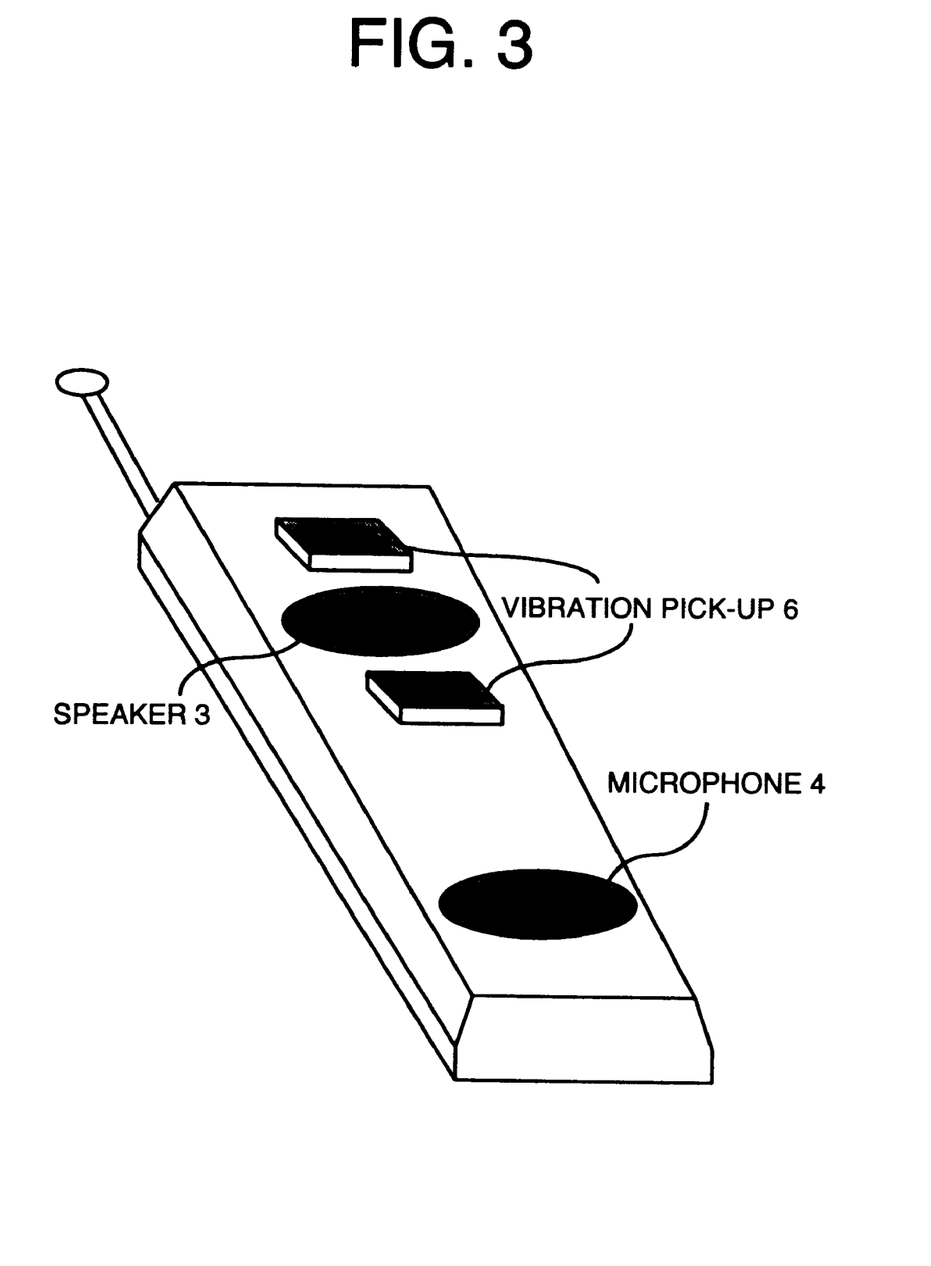
FIG. 3 illustrates to outward appearance of a transmitter/receiver set according to the present invention.

FIG. 3 is a perspective view to illustrate one example of the appearance of a transmitter receiver set according to the invention. This example is characterized in that the vibration pick-up 6 is placed near the speaker 5 in the handset-type transmitter/receiver set. The vibration pick-up 6 is placed at such a position that, when the user holds the transmitter/receiver set to the ear for conversation, the pick-up touches the ear. The bone conduction sound signal detected by the vibration pick-up 6 is utilized during conversation to emphasize the transmitting voice of the user and to reduce the noise inputted simultaneously with the transmitting voice.

The example as shown in FIG. 3, containing the construction described in the first embodiment or the second embodiment, is able to remove the echo components of the output from the speaker 5, detected by the vibration pick-up 6.

As described above, the first adaptive filter 3 is designed so as to operate according to the conversation state. Thereby, the coefficient of the first adaptive filter 3 will not be disturbed, and the echo which detours and comes to the vibration pick-up 6 can be removed. Further, the second adaptive filter 10 estimates the sound component of the person to transmit, and the estimated sound component emphasizes the sound component from the microphone 7, which in consequence reduces the noise component. The adder 14 subtracts the background noise being the estimated residual component, which further reduces the noise component. Further, since the level comparator 16 is provided, it is possible to produce a regulated output level that will not give a queer feeling to the partner of the call.

The switches 18, 19 are provided to thereby switch the conversation mode to either the handset mode or the handsfree mode. In either of the modes, the echo can be removed. If a switch for switching into the handset mode or the handsfree mode is provided on the transmitter/receiver set, it is recommended to interlock this switch with the switches 18, 19.

Further, if the transmitter/receiver set is integrated into the configuration as shown in FIG. 3, it is possible to converse with good sound quality in noisy environments without wearing an earphone-mic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sound processing unit comprising:
   a vibration pick-up that detects a bone conduction sound and outputs it as a bone conduction sound signal;
   a double talk detector that compares a level of an input sound signal inputted through a first input terminal with a level of a transmitting signal inputted through a second input terminal, and outputs a state signal to indicate a receiving state when the level of the input sound signal is judged to be more than a first specific value and the level of the transmitting signal is judged to be less than a first specific value;
   a first adaptive filter that updates a first filter coefficient when the state signal indicates the receiving state, and generates to output a estimated-echo signal in accordance with the first filter coefficient on the basis of the input sound signal and an estimated bone conduction sound signal; and
   a first adder that subtracts the estimated-echo signal from the bone conduction sound signal to obtain and output the estimated bone conduction sound signal.

2. A sound processing unit as claimed in claim 1, wherein when the double talk detector compares the level of the input sound signal with the level of the transmitting signal, it outputs the state signal to indicate a double talk state when the levels of both the input sound signal and the transmitting signal are judged to be more than the first specific value, outputs the state signal to indicate a transmitting state when the level of the transmitting signal is judged to be more than a third specific value and the level of the input sound signal is judged to be less than a fourth specific value, and outputs the state signal to indicate a silent state when the levels of both the input sound signal and the transmitting signal are judged to be less than a fifth specific value.

3. A sound processing unit as claimed in claim 1, further comprising a second adder that adds the transmitting signal and the estimated bone conduction sound signal to output an emphasized sound signal.

4. A sound processing unit as claimed in claim 3, further comprising an amplifier that regulates a level of the emphasized sound signal to have the same level as the level of the transmitting signal.

5. A sound processing unit as claimed in claim 3, further comprising:
   a third adder that subtracts the estimated bone conduction sound signal from the transmitting signal and outputs a residual signal; and
   a fourth adder that subtracts the residual signal from the emphasized sound signal to obtain and output a noise elimination signal.

6. A sound processing unit as claimed in claim 5, further comprising an amplifier that regulates a level of the noise elimination signal to have the same level as the level of the transmitting signal.

7. A sound processing unit as claimed in claim 6, wherein the double talk detector compares the level of the input sound signal with the level of the transmitting signal, outputs the state signal to indicate a double talk state when the levels of both the input sound signal and the transmitting signal are judged to be more than specific value and the level of the residual signal is judged to be less than a specific value, outputs the state signal to indicate the receiving state when the level of the input sound signal is judged to be more than a specific value and the level of the transmitting signal is judged to be less than a specific value, outputs the state signal to indicate a transmitting state when the level of the transmitting signal is judged to be more than a specific value and the level of the input sound signal and the level of the residual signal are judged to be less than a specific value, and outputs the state signal to indicate a silent state when the levels of both the input sound signal and the transmitting signal are judged to be less than a specific value.

8. A sound processing unit as claimed in claim 1, further comprising:
   a second adaptive filter that generates to output an estimated sound signal on the basis of the estimated bone conduction sound signal, a residual signal, and a second filter coefficient;
   a second adder that adds the transmitting signal and the estimated sound signal and outputs an emphasized sound signal; and
   a third adder that subtracts the estimated sound signal from the transmitting signal and outputs the residual signal.

9. A sound processing unit as claimed in claim 8, further comprising an amplifier that regulates a level of the emphasized sound signal to have the same level as the level of the transmitting signal.

10. A sound processing unit as claimed in claim 8, further comprising a fourth adder that subtracts the residual signal from the emphasized sound signal to obtain and output a noise elimination signal.

11. A sound processing unit as claimed in claim 10, further comprising an amplifier that regulates a level of the noise elimination signal to have the same level as the level of the transmitting signal.

12. A sound processing unit as claimed in claim 7, wherein the second adaptive filter generates to output an estimated sound signal on the basis of the estimated bone conduction sound signal, the residual signal, and the second filter coefficient, when the state signal indicates the transmitting state.

13. A sound processing unit comprising:
   a vibration pick-up that detects a bone conduction sound and outputs it as a bone conduction sound signal;
   a double talk detector that compares a level of an input sound signal inputted through a first input terminal with a level of a transmitting signal inputted through a second input terminal, and outputs a state signal to indicate a receiving state when the level of the input sound signal is judged to be more than a first specific value and the level of the transmitting signal is judged to be less than a second specific value;
   a first adaptive filter that updates a first filter coefficient when the state signal indicates the receiving state, and generates to output an estimated-echo signal in accordance with the first filter coefficient on the basis of the input sound signal and an estimated bone conduction sound signal;
   a first adder that subtracts the estimated-echo signal from the bone conduction sound signal and outputs the estimated bone conduction sound signal;
   a first switch that outputs the input sound signal as a first input signal in a handsfree mode, and outputs the estimated bone conduction sound signal as the first input signal in a handset mode;
   a second adder that adds the transmitting signal and the first input signal to obtain and output an emphasized sound signal;
   an amplifier that regulates a level of the emphasized sound signal to have the same level as the level of the transmitting signal;
   a third adder that subtracts the first input signal from the transmitting signal to obtain and output a residual signal; and
   a second switch that outputs the residual signal as a second switch output signal in the handsfree mode, and outputs an output from the amplifier as the second switch output signal.

14. A sound processing unit as claimed in claim 13, further comprising a second adaptive filter that generates an estimated sound signal on the basis of an output from the first switch and the residual signal in accordance with a second filter coefficient, and outputs the estimated sound signal as the first input signal.

15. A sound processing unit as claimed in claim 14, wherein, on the basis of the output from the first switch and the residual signal in accordance with the second filter coefficient, the second adaptive filter generates to output the estimated sound signal in the handset mode when the state signal indicates the transmitting state, and generates to output the estimated sound signal in the handsfree mode when the state signal indicates the receiving state.

16. A sound processing unit comprising:
   a speaker disposed at a position on a body of the unit, which outputs an input sound signal inputted through a first input terminal;
   a microphone disposed at another position on the body of the unit;
   a vibration pick-up disposed at a position near the speaker on the body of the unit such that the ear of a user touches the pick-up during conversation, which detects a bone conduction sound and which outputs it as a bone conduction sound signal;
   a double talk detector that compares a level of the input sound signal with a level of the transmitting signal, and outputs a state signal to indicate a receiving state when the level of the input sound signal is judged to be more than a first specific value and the level of the transmitting signal is judged to be less than a second specific value;
   a first adaptive filter that updates a first filter coefficient when the state signal indicates the receiving state, and generates to output a estimated-echo signal in accordance with the first filter coefficient on the basis of the input sound signal and an estimated bone conduction sound signal;

a first adder that subtracts the estimated-echo signal from the bone conduction sound signal to obtain and output the estimated bone conduction sound signal;

a second adder that adds the transmitting signal and the estimated bone conduction sound signal to obtain and output an emphasized sound an amplifier that regulates a level of the emphasized sound signal to have the same level as the level of the transmitting signal.

* * * * *